United States Patent
Qureshi et al.

(10) Patent No.: US 12,291,198 B2
(45) Date of Patent: May 6, 2025

(54) OPTIMAL ENGAGEMENT OF AUTOMATED FEATURES TO ASSIST INCAPACITED DRIVERS

(71) Applicant: GM GLOBAL TECHNOLOGY OPERATIONS LLC, Detroit, MI (US)

(72) Inventors: Khizar Ahmad Qureshi, Pickering (CA); Mehdi Abroshan, Waterloo (CA); Reza Zarringhalam, Whitby (CA); Mohammadali Shahriari, Markham (CA); Apral Singh Hara, Lasalle (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 204 days.

(21) Appl. No.: 18/183,386

(22) Filed: Mar. 14, 2023

(65) Prior Publication Data
US 2024/0308501 A1    Sep. 19, 2024

(51) Int. Cl.
*B60W 30/09*     (2012.01)
*B60Q 9/00*      (2006.01)
*B60W 10/18*     (2012.01)
*B60W 10/20*     (2006.01)

(52) U.S. Cl.
CPC .............. *B60W 30/09* (2013.01); *B60Q 9/00* (2013.01); *B60W 10/18* (2013.01); *B60W 10/20* (2013.01); *B60W 2540/26* (2013.01); *B60W 2710/18* (2013.01); *B60W 2710/20* (2013.01)

(58) Field of Classification Search
CPC ...... B60W 30/09; B60W 10/18; B60W 10/20; B60W 2540/26; B60W 2710/18; B60W 2710/20; B60Q 9/00; B60Q 9/002; G08G 1/16; B60T 8/1755; B62D 1/00
USPC .......................................................... 701/26
See application file for complete search history.

(56) References Cited

U.S. PATENT DOCUMENTS 7,124,027 B1 * 10/2006 Ernst, Jr. ............... B60W 30/09
                                                      701/301
2013/0204457 A1 * 8/2013 King ................... B60R 16/0373
                                                        701/1
2017/0291602 A1 * 10/2017 Newman ............... B60W 10/04
(Continued)

FOREIGN PATENT DOCUMENTS

EP           3576074 A1 * 12/2019 ........ B60W 30/0956

OTHER PUBLICATIONS

Youngjae et al., "Detecting Driver Fatigue based on the Driver's Response Pattern and the Front View Environment of an Automobile," 2008, Publisher: IEEE.*
(Continued)

*Primary Examiner* — Tuan C To
(74) *Attorney, Agent, or Firm* — Lorenz & Kopf LLP (57) ABSTRACT

Methods and systems are provided that include one or more sensors configured to obtain sensor data pertaining to both a driver of a vehicle and an environment surrounding the vehicle; and a processor that is coupled to the one or more sensors and that is configured to at least facilitate determining, using the sensor data, when the driver is incapacitated; determining, using the sensor data, when a threat is detected for the vehicle; and taking action to avoid the threat when the driver is incapacitated and the threat is detected, via instructions provided by the processor.

20 Claims, 6 Drawing Sheets

(56) References Cited

U.S. PATENT DOCUMENTS

2019/0235515 A1* 8/2019 Shirvani .............. G05D 1/0221
2024/0153380 A1* 5/2024 Barcia ................... G08G 1/166

OTHER PUBLICATIONS

A. R. Beukman et al., "A multi-sensor system for detection of driver fatigue," 2016, Publisher: IEEE.*

* cited by examiner

OPTIMAL ENGAGEMENT OF AUTOMATED FEATURES TO ASSIST INCAPACITATED DRIVERS

TECHNICAL FIELD

The technical field generally relates to vehicles and, more specifically, to systems and methods for controlling automated systems of vehicles to assist incapacitated drivers.

BACKGROUND

Certain vehicles today have automated features that provide for automated driving and/or assistance for a driver of the vehicle. These features may include, for example, automated steering, automated braking, and other automated features and variations thereof. However, existing techniques may not always be optimal, for example when a driver has not activated such automated features, but the driver is incapacitated in one manner or another.

Accordingly, it is desirable to provide improved methods and systems for controlling automated features of a vehicle, including when a driver of the vehicle is incapacitated. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided that includes obtaining sensor data, from one or more sensors of a vehicle, the sensor data pertaining to both a driver of the vehicle and an environment surrounding the vehicle: determining, via a processor using the sensor data, when the driver is incapacitated: determining, via the processor using the sensor data, when a threat is detected for the vehicle; and taking action to avoid the threat when the driver is incapacitated and the threat is detected, in accordance with instructions provided by the processor.

Also in an exemplary embodiment, the step of taking the action includes automatically providing an alarm when the driver is incapacitated and the threat is detected, in accordance with the instructions provided by the processor.

Also in an exemplary embodiment, the step of taking the action includes automatically controlling movement of the vehicle when the driver is incapacitated and the threat is detected, in accordance with the instructions provided by the processor.

Also in an exemplary embodiment, the step of automatically controlling movement of the vehicle includes automatically controlling braking and steering of the vehicle, in accordance with the instructions provided by the processor, when the driver is incapacitated and the threat is detected.

Also in an exemplary embodiment, the method further includes calculating, via the processor, a safety margin for a vehicle event associated with the threat, based on a virtual receding horizon using the sensor data, wherein the step of taking the action includes taking the action based on the safety margin when the driver is incapacitated and the threat is detected, in accordance with the instructions provided by the processor.

Also in an exemplary embodiment, the method further includes calculating, via the processor, an optimal time for intervention to avoid the vehicle event, based on the safety margin using the sensor data: wherein the step of taking the action includes taking the action with timing that is based on the optimal time when the driver is incapacitated and the threat is detected, in accordance with the instructions provided by the processor.

Also in an exemplary embodiment, the optimal time is determined via the processor as a latest possible time to safely avoid the vehicle event.

Also in an exemplary embodiment, the method further includers determining, via the processor using the sensor data and the safety margin, a capability of one or more automated driving features for avoiding the vehicle event: wherein the step of taking the action is based on the capability of the one or more automated driving features for avoiding the vehicle event.

Also in an exemplary embodiment, the step of taking the action includes providing an alert for one or more individuals outside the vehicle when it is determined that the one or more automated driving features are not capable for avoiding the vehicle event.

In another exemplary embodiment a system is provided that includes one or more sensors configured to obtain sensor data pertaining to both a driver of a vehicle and an environment surrounding the vehicle; and a processor that is coupled to the one or more sensors and that is configured to at least facilitate determining, using the sensor data, when the driver is incapacitated: determining, using the sensor data, when a threat is detected for the vehicle; and taking action to avoid the threat when the driver is incapacitated and the threat is detected, via instructions provided by the processor.

Also in an exemplary embodiment, the processor is configured to at least facilitate automatically providing an alarm when the driver is incapacitated and the threat is detected, via the instructions provided by the processor.

Also in an exemplary embodiment, the processor is configured to at least facilitate automatically controlling movement of the vehicle when the driver is incapacitated and the threat is detected, via the instructions provided by the processor.

Also in an exemplary embodiment, the processor is configured to at least facilitate automatically controlling braking and steering of the vehicle, via the instructions provided by the processor, when the driver is incapacitated and the threat is detected.

Also in an exemplary embodiment, the processor is configured to at least facilitate calculating a safety margin for a vehicle event associated with the threat, based on a virtual receding horizon using the sensor data; and taking the action based on the safety margin when the driver is incapacitated and the threat is detected, via the instructions provided by the processor.

Also in an exemplary embodiment, the processor is configured to at least facilitate calculating an optimal time for intervention to avoid the vehicle event, based on the safety margin using the sensor data; and taking the action with timing that is based on the optimal time when the driver is incapacitated and the threat is detected, via the instructions provided by the processor.

Also in an exemplary embodiment, the processor is configured to at least facilitate determining the optimal time as a latest possible time to safely avoid the vehicle event.

Also in an exemplary embodiment, the processor is configured to at least facilitate determining, using the sensor data and the safety margin, a capability of one or more automated driving features for avoiding the vehicle event; and taking the action, via the instructions provided by the processor, based on the capability of the one or more automated driving features for avoiding the vehicle event.

Also in an exemplary embodiment, the processor is configured to at least facilitate providing an alert for one or more individuals outside the vehicle, via the instructions provided by the processor, when it is determined that the one or more automated driving features are not capable for avoiding the vehicle event.

In another exemplary embodiment, a vehicle is provided that includes a body: a drive system configured to generate movement of the body: one or more sensors disposed on or within the body and configured to obtain sensor data pertaining to both a driver of the vehicle and an environment surrounding the vehicle; and a processor disposed within the body and coupled to the one or more sensors, the processor configured to at least facilitate determining, using the sensor data, when the driver is incapacitated: determining, using the sensor data, when a threat is detected for the vehicle; and taking action to avoid the threat when the driver is incapacitated and the threat is detected, via instructions provided by the processor.

Also in an exemplary embodiment, the processor is configured to at least facilitate calculating a safety margin for a vehicle event associated with the threat, based on a virtual receding horizon using the sensor data: calculating an optimal time for intervention to avoid the vehicle event, based on the safety margin using the sensor data; and taking the action based on the safety margin and the optimal time when the driver is incapacitated and the threat is detected, via the instructions provided by the processor.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
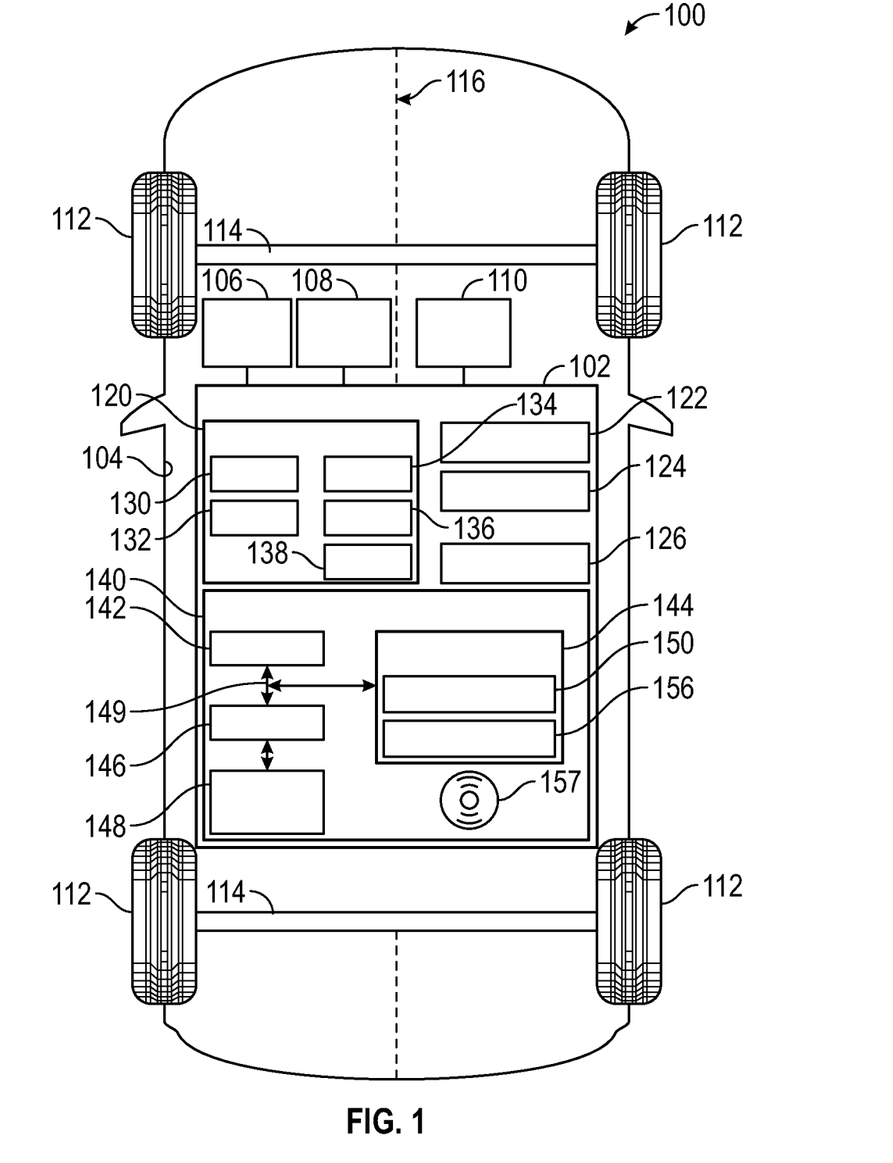
FIG. 1 is a functional block diagram of a vehicle having a control system for controlling automated driving features, including when a driver of the vehicle is incapacitated, in accordance with exemplary embodiments.

FIG. 1 illustrates a vehicle 100. In various embodiments, and as described below, the vehicle 100 includes a control system 102 for controlling automated driving features, including when a driver of the vehicle 100 is incapacitated, in accordance with an exemplary embodiment.

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In certain embodiments, the vehicle 100 may comprise an autonomous or semi-autonomous vehicle, for example in which vehicle control (including acceleration, deceleration, braking, and/or steering) is automatically planned and executed by the control system 102, in whole or in part. In certain other embodiments, the vehicle 100 may be operated in whole or in part by a human driver.

In the depicted embodiment, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As noted above, in certain embodiments, the vehicle 100 includes one or more functions controlled automatically via the control system 102. In certain embodiments, the vehicle 100 comprises an autonomous vehicle, such as a semi-autonomous vehicle or a fully autonomous vehicle, for automated control of the drive system 110 and/or other vehicle components. However, this may vary in other embodiments, for example in which a human driver may control the drive system 110.

As depicted in FIG. 1, the vehicle 100 also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering column coupled to the axles 114 and/or the wheels 112) that are controlled via inputs provided by a driver (e.g., via a steering wheel in certain embodiments) and/or automatically via the control system 102.

In the embodiment depicted in FIG. 1, in certain embodiments, the control system 102 is coupled to the braking system 106, the steering system 108, and the drive system 110. In various embodiments, the control system 102 provides control over automated features of the vehicle 100 (including automated operation of the braking system 106, the steering system 108, and/or the drive system 110), including when a driver is incapacitated (e.g., including situations in which such automated features are not activated and a driver of the vehicle 100 is unable to activate the automated features). As depicted in FIG. 1, in various embodiments, the control system 102 includes a sensor array 120, a navigation system 122, a display 124, a transceiver 126, and a controller 140.

In various embodiments, the sensor array 120 obtains sensor data for use by the controller 140 in controlling one or more automated features for the vehicle 100. In various embodiments, the sensor array 120 includes one or more cameras 130, detection sensors 132, speed sensors 134, steering sensors 136, and input sensors 138, among other possible sensors.

In various embodiments, the cameras 130 obtain camera images both inside the vehicle 100 (including of the driver) as well as outside the vehicle 100 (including an environment surrounding the vehicle, including a roadway or path on which the vehicle 100 is operating, along with other vehicles, pedestrians, obstacles, a curvature of the roadway, or path, and/or information as to the roadway or path). In various embodiments, the cameras 130 are positioned at a plurality of locations on or within the body 104 of the vehicle 100.

In various embodiments, the detection sensors 132 obtain detection sensor data outside the vehicle 100 as to an environment surrounding the vehicle, including as to a roadway or path on which the vehicle 100 is operating, including a curvature of the roadway as well as detection of other vehicles, pedestrians, obstacles, and/or information as to the roadway or path. In various embodiments, the detection sensors 132 are positioned at a plurality of locations on or within the body 104 of the vehicle 100. In certain embodiments, the detection sensors 132 comprise radar sensors of the vehicle 100. In certain embodiments, one or more other different types of detection sensors 132 may be utilized such as, by way of exemplar, LiDAR, sonar, infrared sensors, and the like.

In various embodiments, the speed sensors 134 measure a speed of the vehicle 100 and/or obtain sensor data that may be used to calculate the speed of the vehicle 100. In certain embodiments, the speed sensors 134 comprise wheel speed sensors that are coupled to one or more wheels 112 of the vehicle 100. However, in certain other embodiments, one or more other different types of speed sensors 134 may be utilized to measure or determine speed (e.g., one or more accelerometers, and so on).

In various embodiments, the steering sensors 136 measure a steering angle for the vehicle 100. In certain embodiments, the steering sensors 136 comprise steering wheel sensors that are configured to measure an angle of a steering wheel of the steering system 108. In certain other embodiments, the steering sensors 136 may measure one or more other types of steering angles, such as an angle of one or more of the wheels 112, and so on.

In various embodiments, the input sensors 138 receive or detect one or more inputs from a driver of the vehicle 100.

In certain embodiments, the input sensors 138 receive inputs as to a driver's activating and/or deactivating of one or more automated features of the vehicle 100 (such as automated driving, automated steering, and so on). Also in certain embodiments, the input sensors 138 may also receive other inputs from the driver, such as a driver's control of the braking system 106, steering system 108, and/or drive system 110 (e.g., through the driver's engagement of a brake pedal, steering wheel, and/or accelerator pedal, and so on).

Also in various embodiments, the navigation system 122 (also referred to herein as a "location system") is configured to obtain and/or generate data as to a position and/or location in which the vehicle 100 is located and/or is travelling, and including map information and/or other information as to the location (e.g., as to the roadway or path on which the vehicle 100 is travelling). In certain embodiments, the navigation system 122 comprises and/or or is coupled to a satellite-based network and/or system, such as a global positioning system (GPS) and/or other satellite-based system.

In certain embodiments, the vehicle 100 also includes a transceiver 126. In various embodiments, the transceiver 126 receives information regarding the location in which the vehicle 100 is being operated and/or about other information as to the location (e.g., as to the roadway or path on which the vehicle 100 is travelling).

In various embodiments, the display 124 provides information and alerts for a driver of the vehicle 100. In certain embodiments, the display 124 provides notifications for the driver when the driver's attention may be required. In certain embodiments, the display 124 may provide visual alerts (e.g., such as via a visual display screen), audio alerts (e.g., such as via one or more speakers), and/or haptic alerts (e.g., via vibration of a seat of the vehicle 100), among other possible alerts.

In various embodiments, the controller 140 is coupled to the sensor array 120, as well as to the braking system 106, the steering system 108, and the drive system 110. In various embodiments, the controller 140 is also coupled to the navigation system 122, the display 124, and the transceiver 126.

In various embodiments, the controller 140 comprises a computer system, and includes a processor 142, a memory 144, an interface 146, a storage device 148, and a computer bus 149. In various embodiments, the controller (or computer system) 140 obtains sensor data from the sensor array 120, and in certain embodiments additional data via the navigation system 122 and/or the transceiver 126. In various embodiments, the controller 140 utilizes this data to determine when automated features of the vehicle 100 may need to be implemented and controlled, as well as when the driver is incapacitated, and to automatically initiate the automated features when appropriate (e.g., by initiating automated steering, automated braking, and/or other automated features, and/or by alerting the driver and/or others of circumstances warranting the driver's and/or others' attention, and so on). In various embodiments, the controller 140 provides these and other functions in accordance with the steps of the processes and implementations depicted in FIGS. 2-6 and as described further below in connection therewith.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 149. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 150 contained within the memory 144 and, as such, controls the general operation of the controller 140 and the computer system of the controller 140, generally in executing the processes described herein, such as the processes and implementations depicted in FIGS. 2-6 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 150 along with stored values 156 (e.g., that may include maps and associated data, as well as threshold values used for controlling automated functionality for the vehicle 100, and so on).

The bus 149 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120 and/or the navigation system 122. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 150 that executes one or more embodiments of the processes and implementations of FIGS. 2-6 and as described further below in connection therewith. In another exemplary embodiment, the program product may be directly stored in and/or otherwise accessed by the memory 144 and/or a secondary storage device (e.g., disk 157), such as that referenced below.

The bus 149 can be any suitable physical or logical means of connecting computer systems and components. This includes, but is not limited to, direct hard-wired connections, fiber optics, infrared and wireless bus technologies. During operation, the program 150 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
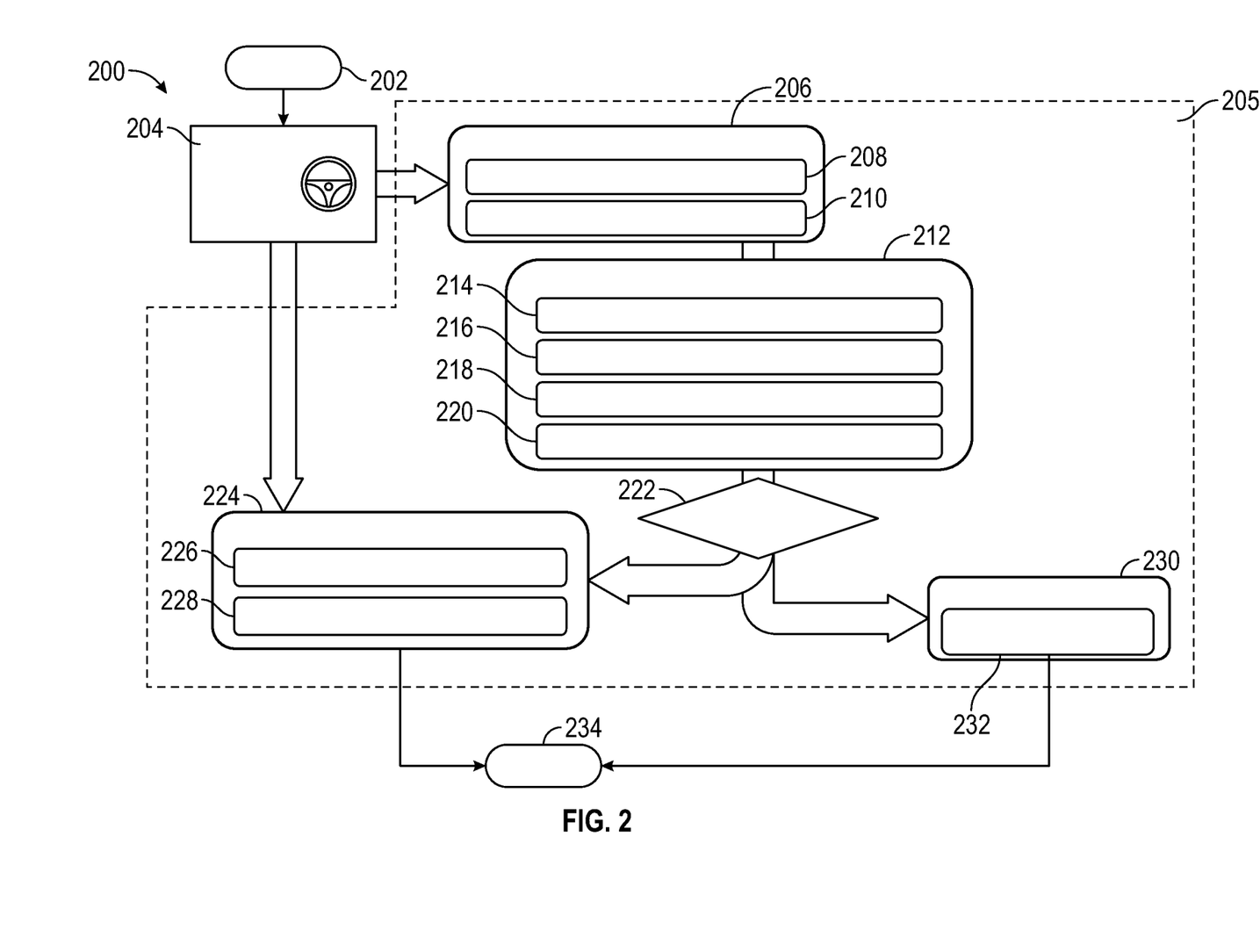
FIG. 2 is a flowchart of a process for controlling automated driving features of a vehicle, including when a driver of the vehicle is incapacitated, and that can be implemented in connection with the vehicle of FIG. 1, including the control system and components thereof, in accordance with exemplary embodiments.

FIG. 2 is a flowchart of a process 200 for controlling automated driving features for a vehicle, including when a driver of the vehicle is incapacitated, in accordance with exemplary embodiments. In various embodiments, the process 200 can be implemented in connection with the vehicle 100 of FIG. 1, including the control system and components thereof.

As depicted in FIG. 2, the process 200 begins at step 202. In various embodiments, the process 200 begins when the vehicle 100 of FIG. 1 is started when the vehicle 100 begins operating in a current drive cycle, and/or in certain embodiments when a driver enters, approaches, and/or turns on the vehicle 100. In various embodiments, the steps depicted in FIG. 2 are performed, preferably continuously, throughout the duration of the process 200.

In various embodiments, sensor data is obtained (step 204). In various embodiments, sensor data is obtained from the sensor array 120 of FIG. 1. Specifically, in various embodiments, the sensor data includes, among other possible sensor data: camera data from cameras 130 of FIG. 1 as to the driver of the vehicle 100 and as to an environment surrounding the vehicle, including the roadway in which the vehicle 100 is operating: detection data from detection sensors 132 (e.g., radar) of FIG. 1 as to other vehicles and/or other objects on the roadway and as to the roadway itself (e.g., including a curvature of the roadway): speed data from speed sensors 134 of FIG. 1 (e.g., wheel speed sensors) as to a speed of the vehicle 100; steering data from steering sensors 136 of FIG. 1 as to a steering angle of the vehicle 100; and input data from input sensors 138 of FIG. 1 as to inputs from the driver.

In various embodiments, monitoring is performed as to the driver and the environment surrounding the vehicle 100 (step 206). In various embodiments, the monitoring is performed via the processor 142 of FIG. 1 based on the sensor data obtained from the sensor array 120 of FIG. 1 step 204. In various embodiments, the monitoring of step 206 has two components, namely: (i) monitoring driver awareness (step 208), and (ii) monitoring potential threats (step 210).

In various embodiments, as part of the monitoring of driver awareness of step 208, a measure of driver awareness is determined. In various embodiments, the measure of driver awareness is determined by the processor 142 of FIG. 1 based on the sensor data of step 204 and the monitoring of step 206. In various embodiments, the measure of driver awareness pertains to whether the driver is actively participating in driving, or instead whether the driver is not actively participating in driving. In various embodiments, the driver is determined to be "incapacitated" when the driver is not actively participating in driving of the vehicle 100. In various embodiments, this is determined by the processor 142 of FIG. 1 based on the sensor data and the monitoring, for example using camera data from the cameras 130 of FIG. 1 that are facing the driver inside the vehicle 100 and/or input sensors 138 of FIG. 1 (e.g., in determining whether the driver is facing the roadway and/or whether the driver is engaging the steering wheel, brake pedal, and/or accelerator pedal, and so on).

Also in various embodiments, as part of the monitoring of potential threats of step 210, a measure of threat assessment is determined. In various embodiments, the measure of threat assessment is determined by the processor 142 of FIG. 1 based on the sensor data of step 204 and the monitoring of step 206. In various embodiments, the measure of threat assessment pertains to whether, and to what extent, a threat is detected on the roadway that may result in an event for the vehicle 100, such as contact with another vehicle or another object, and/or straying from a current or intended lane or path of travel, and so on. In certain embodiments, a "time to event" (or in certain cases a "time to contact") is calculated based on the data, as part of the measure of threat assessment. In various embodiments, this is determined by the processor 142 of FIG. 1 based on the sensor data and the monitoring, for example using camera data from the cameras 130 of FIG. 1 that are facing toward the roadway and/or using detection data from detection sensors 132 (e.g., radar) of FIG. 1.

In various embodiments, determinations are made as to a capability of automated driving (step 212). In various embodiments, during step 212, the capability of automated driving pertains to a capability (e.g., ability) of one or more automated driving features of the vehicle 100 (e.g., automated steering, braking, and/or acceleration) to be able to avoid an event (e.g., contact with another vehicle or object, straying from a current or intended lane or path of travel, and so on) that may otherwise occur. In various embodiments, the determinations of step 212 include multiple components, including: (i) identification of margin (step 214), (ii) analyzing a receding horizon (step 216), (iii) calculating a capability (step 218), and (iv) optimizing activation time for the automated driving features (step 220).

In various embodiments, as part of the identification of the margin of step 214, a quantifiable margin is determined with respect to avoidance of an event (e.g., contact with another vehicle or object, straying from a current or intended lane or path of travel, and so on). In various embodiments, the margin comprises a quantified amount of time or distance to avoid the event (e.g., in one embodiment, as the last possible point in time possible in order to take intervening action to successfully prevent the event from occurring). In various embodiments, this is determined by the processor 142 of FIG. 1 based on the sensor data and the monitoring, for example using camera data from the cameras 130 of FIG. 1 that are facing toward the roadway, along with detection data from detection sensors 132 (e.g., radar) of FIG. 1, vehicle data from the speed sensors 134 and steering sensors 136 of FIG. 1, and so on.

Also in various embodiments (e.g., as part of step 216), an analysis is performed of a virtual receding horizon control (including an initial time "0" up until a predetermined future time "N") with respect to any other detected other vehicles or other objects on the roadway, and including with respect to possible events with respect to the vehicle 100. In various embodiments, this is performed by the processor 142 of FIG. 1 based on the sensor data and the monitoring, for example using camera data from the cameras 130 of FIG. 1 that are facing toward the roadway and/or using detection data from detection sensors 132 (e.g., radar) of FIG. 1. In various embodiments, virtual receding horizon is also utilized by the processor 142 of FIG. 1 in calculating the safety margins in step 214.

Also in various embodiments, as part of the calculating of step 218, a measure of capability is calculated with respect to the capability (e.g., ability) of one or more automated driving features to prevent an event for the vehicle 100. In various embodiments, this is performed by the processor 142 of FIG. 1 based on the sensor data and the monitoring, for example using camera data from the cameras 130 of FIG. 1 that are facing toward the roadway and/or using detection data from detection sensors 132 (e.g., radar) of FIG. 1 along with vehicle data from the speed sensors 134 and steering sensors 136 of FIG. 1.

Also in various embodiments, as part of the optimizing of step 220, an optimized time is determined for the automated driving features. Specifically, in various embodiments, an optimal time is calculated with respect to initiation of the automated driving features in a manner that prevents the event for the vehicle 100 while first providing the driver the opportunity to take actions to avoid the event. In certain embodiments, the optimal time comprises the last point in time in which the automated driving features may be initiated or implemented while still preventing the event for the vehicle 100. In various embodiments, this is performed by the processor 142 of FIG. 1 based on the sensor data and the monitoring, for example using camera data from the cameras 130 of FIG. 1 that are facing toward the roadway and/or using detection data from detection sensors 132 (e.g., radar) of FIG. 1 along with vehicle data from the speed sensors 134 and steering sensors 136 of FIG. 1.

In various embodiments, a determination is made as to whether the event is controllable (step 222). Specifically, in various embodiments, a determination is made as to whether the event for the vehicle 100 can be avoided using one or more of the automated driving features. In various embodiments, the event is deemed to be controllable if the event can be avoided via implementation of the automated driving features. Conversely, also in various embodiments, the event is instead deemed to be not controllable if the event cannot be avoided via implementation of the automated driving features. In various embodiments, this is performed by the processor 142 of FIG. 1 based on the sensor data and the monitoring, for example using camera data from the cameras 130 of FIG. 1 that are facing toward the roadway and/or using detection data from detection sensors 132 (e.g., radar) of FIG. 1 along with vehicle data from the speed sensors 134 and steering sensors 136 of FIG. 1.

In various embodiments, if it is determined in step 222 that the event is controllable (i.e., that the event can be avoided via implementation of the automated driving features), then the process proceeds to step 224. In various embodiments, the automated features are implemented in order to provide safe system intervention to prevent the event for the vehicle 100 from occurring. Specifically, in certain embodiments, automated driving is enabled (step 226) and navigation of the vehicle is performed (step 228). In various embodiments, one or more automated driving features (such as automated steering, automated braking, and/or automated acceleration control) are implemented in order to prevent the event from occurring. Also in various embodiments, the vehicle 100 is automatically navigated to drive safely without incurring any vehicle events. In various embodiments, the automated driving features are implemented, and the vehicle 100 is operated and navigated in this manner, via instructions provided by the processor 142 of FIG. 1 and that are implemented by the braking system 106, steering system 108, and drive system 110 of FIG. 1. In various embodiments, the process 200 either repeats in a new iteration (e.g., if the vehicle 100 is still operating in a current vehicle drive) or terminates at step 234 (e.g., when the current vehicle drive is over).

Conversely, in various embodiments, if it is instead determined in step 222 that the event is not controllable (i.e., that the event cannot be avoided via implementation of the automated driving features), then the process proceeds instead to step 230. In various embodiments, one or more alerts are engaged during step 230. In various embodiments, one or more audio, visual, haptic, and/or other alerts are provided, for example via the display 124 of FIG. 1 in accordance with instructions provided thereto by the processor 142 of FIG. 1. In addition, in certain embodiments, emergency authorities are also contacted automatically in accordance with instructions provided by the processor 142 of FIG. 1.

Also in certain embodiments, driver inputs are also adapted and implemented (step 232). For example, in certain embodiments, driver inputs (e.g., for braking, steering, acceleration, and/or deceleration) are received via the input sensors 138 of FIG. 1 and are adapted and/or implemented via the processor 142 of FIG. 1 via instructions for corresponding braking, steering, acceleration, and/or deceleration that are provided to and implemented by the braking system 106, steering system 108, and/or drive system 110 of FIG. 1. In various embodiments, the process 200 either repeats in a new iteration (e.g., if the vehicle 100 is still operating in a current vehicle drive) or terminates at step 234 (e.g., when the current vehicle drive is over).

As depicted in FIG. 2, in various embodiments, the combination of steps 206-232 may collectively be referenced as subroutine (or sub-process) 205, which is described in greater detail further below in connection with FIG. 4 in accordance with an exemplary embodiment.

Figure 3A:
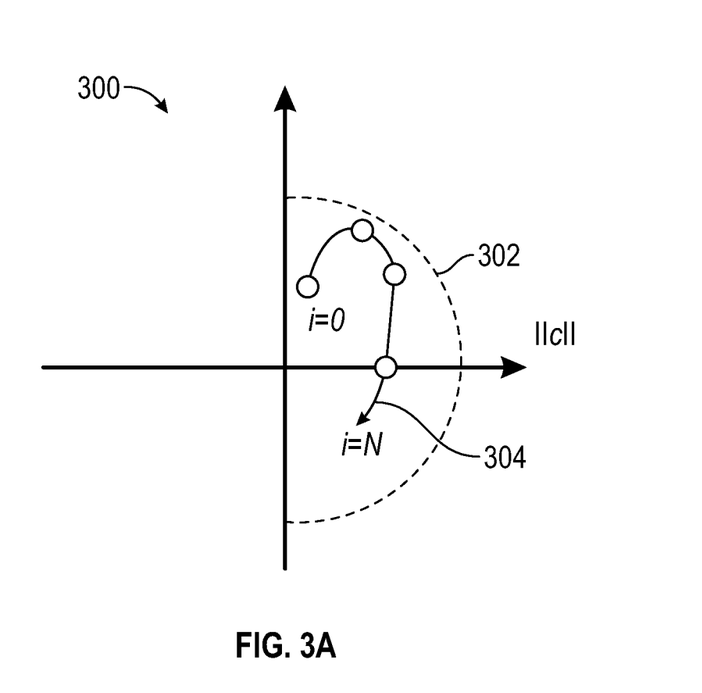
FIGS. 3A and 3B are graphical illustrations of certain implementations of the process of FIG. 2, in accordance with exemplary embodiments.
Figure 3B:
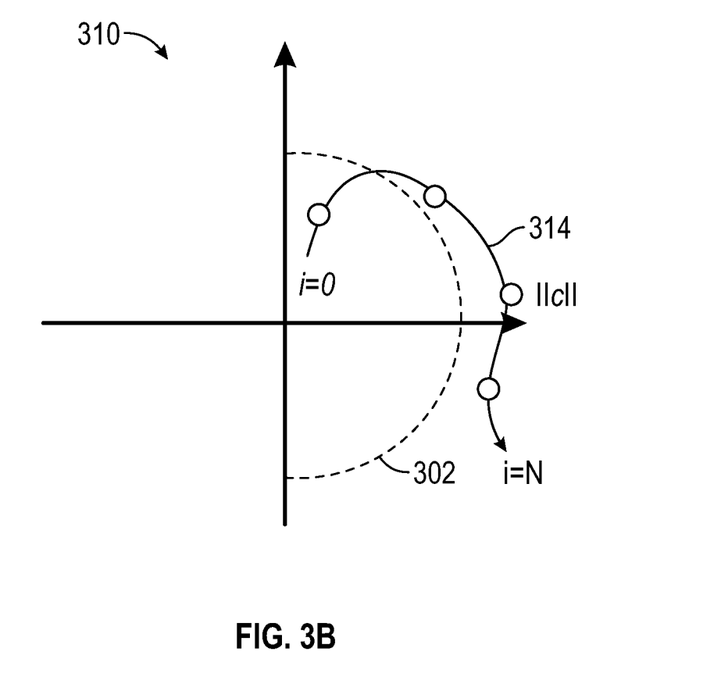

With reference now to FIGS. 3A and 3B, graphical illustrations 300, 310 are provided in FIGS. 3A and 3B, respectively, of certain implementations of the process 200 of FIG. 2, in accordance with exemplary embodiments. Specifically, in various embodiments, the graphical illustrations 300, 310 illustrate exemplary embodiments of the determination of safety margins along with the quantified capabilities of the automated driving features of steps 212-220 of the process 200 of FIG. 2.

As depicted in FIGS. 3A and 3B, a safety margin 302 is utilized in both graphical illustrations 300, 310 to illustrate when a vehicle event may occur and when it may be avoided. For example, in a first example comprising illustration 300 of FIG. 3A, a receding horizon 304 (including an initial time "0" through a future time "N") can be continued within a semi-circle defining the safety margin 302, via implementation of appropriate automated driving functionality, in order to avoid the vehicle event. On the other hand, in a second example comprising illustration 310 of FIG. 3B, a receding horizon 314 (including an initial time "0" through a future time "N") cannot be continued within the semi-circle defining the safety margin 302, meaning that the vehicle event cannot be avoided via implementation of the appropriate automated driving functionality.

In various embodiments, in conjunction with the information of FIGS. 3A and 3B, a capability $C_i$ for the automated driving features at any particular point "i" (e.g., for preventing a vehicle event when initiating at time "i") may be expressed with the following equation:

$$C_i = \Sigma_{k=1}^{m} w_{ki}(x_{ki} - x_{ki}^d)^2 \qquad \text{(Equation 1), wherein:}$$

$$x = \left(\rho_p, \frac{1}{TTLC}, V_x, \delta_{ff}, \frac{1}{TTC}\right), \qquad \text{(Equation 2)}$$

and wherein:

If $\forall i \in [1, n]$ $\sqrt{C_i^2 + \dot{C}_i^2} < \sqrt{C_{sm}^2 + \dot{C}_{sm}^2} \Rightarrow i^{min} =$ $$\underset{i}{\mathrm{argmin}} \left(\sqrt{C_{sm}^2 + \dot{C}_{sm}^2} - \sqrt{C_i^2 + \dot{C}_i^2}\right),$$

and otherwise⇒Not Feasible for Safe System Intervention: (Equation 3); and further wherein:

"TTLC" represents time to lane crossing: "TTC" represents time to contact; "$\rho_p$" represents path curvature: "$V_x$" represents vehicle speed: "$\delta_{ff}$" represents a feed forward steering angle needed to follow the blend path: "$x_k^d$" represents the desired state; "$i_{int}$" represents an intervention time threshold: "n" represents the number of the time horizon; "m" represents the number of state variables; and "$C_{sm}$" represents a safe intervention cost function; and wherein:

the Engagement State=1, if $i_{min} < i_{int}$, and the
Engagement State=0 otherwise (Equation 4).

Figure 4:
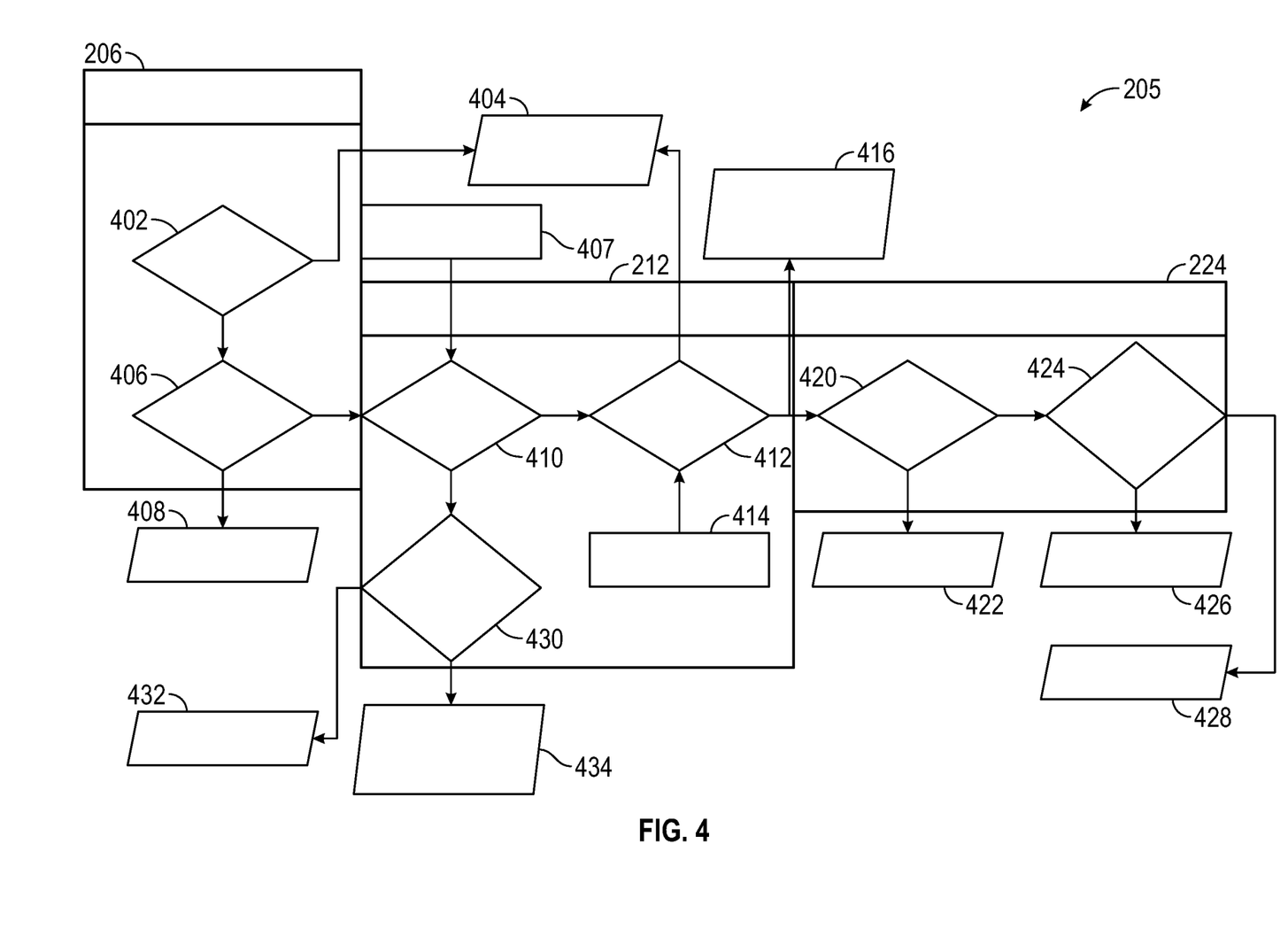
FIG. 4 is a flowchart of an implementation corresponding to a subroutine of the process of FIG. 2, in accordance with exemplary embodiments.

With reference now to FIG. 4, a flowchart of an implementation corresponding to a subroutine of the process 200 of FIG. 2, namely the subroutine 205 depicted in FIG. 2 and as mentioned above.

As depicted in FIG. 4, in various embodiments the subroutine 205 includes the driver and environment monitoring of step 206 of FIG. 2. In various embodiments, a determination is made as to whether the driver is incapacitated (step 402). Similar to the discussion above, in various embodiments, the driver is determined to be "incapacitated" when the driver is not actively participating in driving of the vehicle 100. Also similar to the discussion above, in various embodiments, this is determined by the processor 142 of FIG. 1 based on the sensor data and the monitoring, for example using camera data from the cameras 130 of FIG. 1 that are facing the driver inside the vehicle 100 and/or input sensors 138 of FIG. 1 (e.g., in determining whether the driver is facing the roadway and/or whether the driver is engaging the steering wheel, brake pedal, and/or accelerator pedal, and so on).

In various embodiments, if it is determined that the driver is not incapacitated, then the subroutine proceeds to step 404. In various embodiments, during step 404, the vehicle 100 continues to operate as before, without any changes made (e.g., without the initiating of any automated driving features), and with the continued collection of updated sensor data until conditions change.

Conversely, if it is instead determined that the driver is incapacitated, then the subroutine proceeds instead to step 406. In various embodiments, during step 406, a determination is made as to whether a threat is detected on the roadway that may result in an event for the vehicle 100, such as contact with another vehicle or another object, and/or straying from a current or intended lane or path of travel, and so on. In certain embodiments, a "time to event" (or in some cases a "time to contact") is calculated based on the data, as part of the measure of threat assessment. In various embodiments, this is determined by the processor 142 of FIG. 1 based on the sensor data and the monitoring, for example using camera data from the cameras 130 of FIG. 1 that are facing toward the roadway and/or using detection data from detection sensors 132 (e.g., radar) of FIG. 1 along with vehicle data from the speed sensors 134 and steering sensors 136 of FIG. 1.

In various embodiments, if it is determined that no threat is detected, then the subroutine proceeds to step 408. In various embodiments, during step 408, the vehicle 100 continues to operate as before, without any changes made (e.g., without the initiating of any automated driving features), and with the continued collection of updated sensor data until conditions change.

Conversely, if it is instead determined that a threat is detected, then the subroutine proceeds instead to step 410, in accordance with the performance of step 212 of FIG. 2 (pertaining to the quantification of the capability of automated driving features). In various embodiments, during step 410, a determination is made as to whether system intervention is possible. In various embodiments, this comprises a determination as to whether or not the implementation of one or more automated driving features would be successful in preventing an event for the vehicle 100. In various embodiments, this determination is made by processor 142 of FIG. 1, using the sensor data from the sensor array 120 of FIG. 1 (e.g., as described above).

In various embodiments, if it is determined in step 410 that system intervention is possible (e.g., that implementation of one or more automated driving features would be successful in preventing an event for the vehicle 100), then the process proceeds to step 412. In various embodiments, during step 412, a determination is made as to whether an optimum intervention time is present. In various embodiments, the processor 142 of FIG. 1 determines whether the current time corresponds to the optimum intervention time (e.g., as calculated with respect to step 220 of FIG. 2 and described) and/or is within a predetermined threshold 414 of the intervention time (e.g., as stored in the memory 144 of FIG. 1 as one of the stored values 156 thereof).

In various embodiments, if it is determined that the current time does not correspond to the optimum intervention time, then the subroutine proceeds to the above-referenced step 404. In various embodiments, during step 404, the vehicle 100 continues to operate as before, without any changes made (e.g., without the initiating of any automated driving features), and with the continued collection of updated sensor data until conditions change (e.g., until the optimum intervention time is present).

In various embodiments, once it is determined that the optimum intervention time is present, then alerts are provided for the driver (step 416). In various embodiments, one or more audio, visual, and/or haptic alerts are provided by the driver via the display 124 of FIG. 1 in accordance with instructions provided by the processor 142 of FIG. 1 (e.g., similar to the discussion above with respect to step 230 of FIG. 2).

In addition, in various embodiments, the subroutine also proceeds to the system intervention of step 224 from FIG. 2. Specifically, in various embodiments as part of the system intervention, a determination is made as to whether a current gap for an automated driving feature is less than a predetermined threshold (step 420). In certain embodiments, this determination is made by the processor 142 of FIG. 1, using the sensor data, as to whether a gap (or distance) between the vehicle 100 and another vehicle used for adaptive cruise control (ACC) is less than a predetermined threshold (e.g., such that a time-to-contact therebetween is less than a predetermined threshold).

In various embodiments, if it is determined in step 420 that the gap (or time-to-contact) is less than the predetermined threshold, then one or more automated driving features are initiated (step 422). In various embodiments, during step 422, automated braking, such as emergency braking or contact imminent braking, is implemented by the braking system 106 of FIG. 1 in accordance with instructions provided thereto by the processor 142 of FIG. 1.

Conversely, in various embodiments, if it is instead determined in step 420 that the gap (or time-to-contact) is greater than or equal to the predetermined threshold, then a determination is made as to whether the vehicle 100 has capability for one or more different automated driving features (step 424). In certain embodiments, during step 424, the processor 142 of FIG. 1 determines whether the vehicle 100 has such capability, such as for automated lane centering (ALC).

In various embodiments, if it is determined in step 424 that the vehicle does have capability for the one or more different automated features, then such different automated feature is implemented (step 426). In certain embodiments, the automated lane centering (ALC) feature is implemented by steering system 108 of FIG. 1 in accordance with instructions provided by the processor 142 of FIG. 1. In certain embodiments, the automated lane centering (ALC) feature is applied in a low-speed lane of the roadway, and the speed is reduced (e.g., by the drive system 110 of FIG. 1 in implementing instructions from the processor 142 of FIG. 1) in implementing a gradual automated stop for the vehicle 100 in the low-speed lane. In addition, in certain embodiments, emergency authorities are also contacted automatically in accordance with instructions provided by the processor 142 of FIG. 1.

Conversely, in various embodiments, if it is instead determined in step 424 that the vehicle does not have capability for the one or more different automated features, then another control strategy is implemented (step 428). In certain embodiments, acceleration of the vehicle 100 is decreased, and the vehicle 100 is enabled to coast (e.g., to a stopping position) with hazard lights on, in accordance with instructions provided by the processor 142 of FIG. 1 and that are implemented via the drive system 110 of FIG. 1. In addition, in certain embodiments, emergency authorities are also contacted automatically in accordance with instructions provided by the processor 142 of FIG. 1.

With reference back to step 410, if it is determined in step 410 that system intervention is not possible (e.g., that implementation of one or more automated driving features would not be successful in preventing an event for the vehicle 100), then the process proceeds to steps 432 and 434, as described below.

In various embodiments, during step 432, alerts are provided for the driver. In various embodiments, audio and haptic alerts are provided by the display 124 of FIG. 1 for the driver in accordance with instructions provided by the processor 142.

Also in various embodiments, during step 434, alerts are also provided for drivers of other vehicles and/or for other individuals outside the vehicle 100. In various embodiments, audio and visual alerts are provided by the display 124 of FIG. 1 for the other drivers and/or other individuals outside the vehicle 100, in accordance with instructions provided by the processor 142. In certain embodiments, such audio and visual alerts may include turning on hazard lights for the vehicle 100, providing pulses of light, sounding the vehicle horn and/or alarm system for the vehicle 100, and so on.

Figure 5:
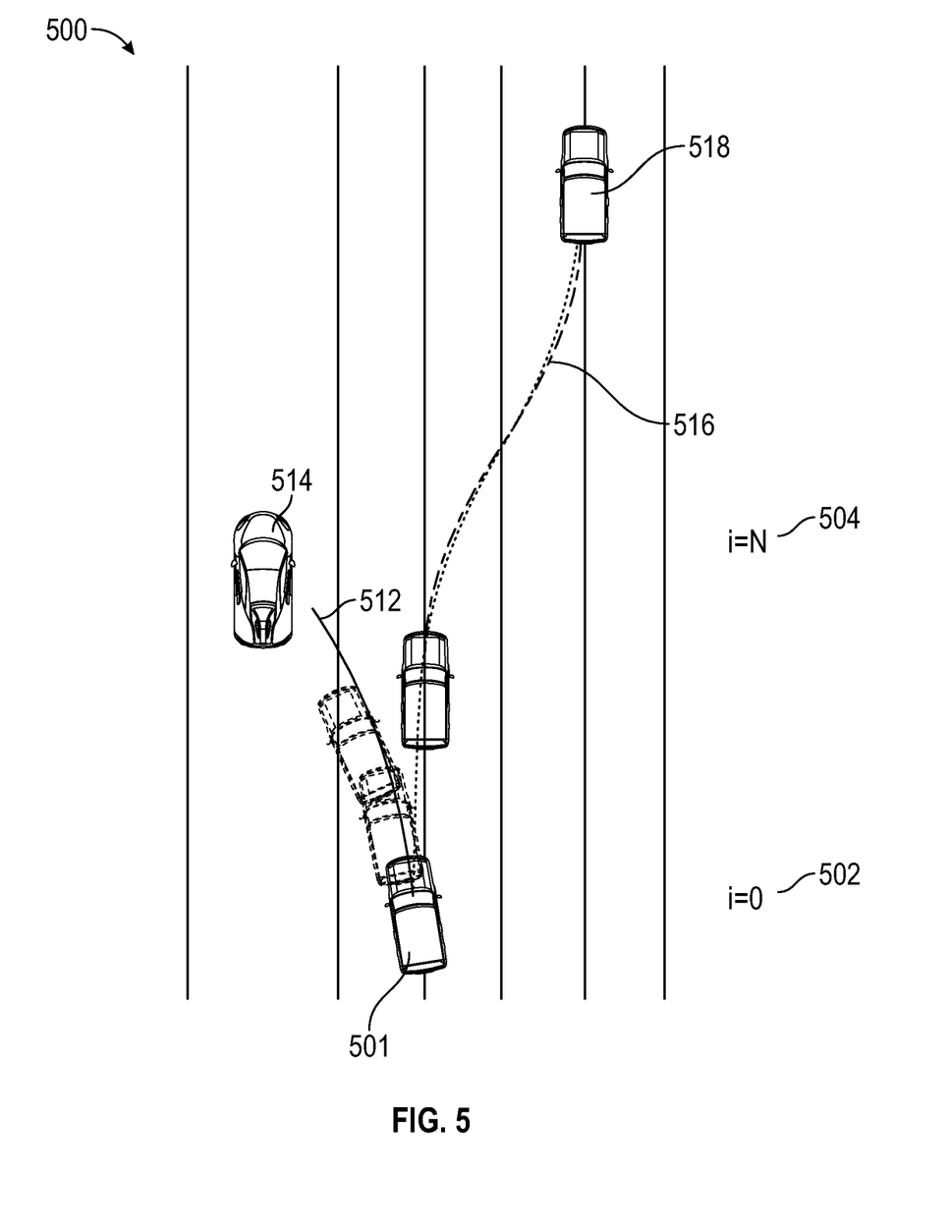
FIGS. 5 and 6 depict exemplary implementations of the process of FIG. 2, including the subroutine of FIG. 4, in accordance with exemplary embodiments.
Figure 6:
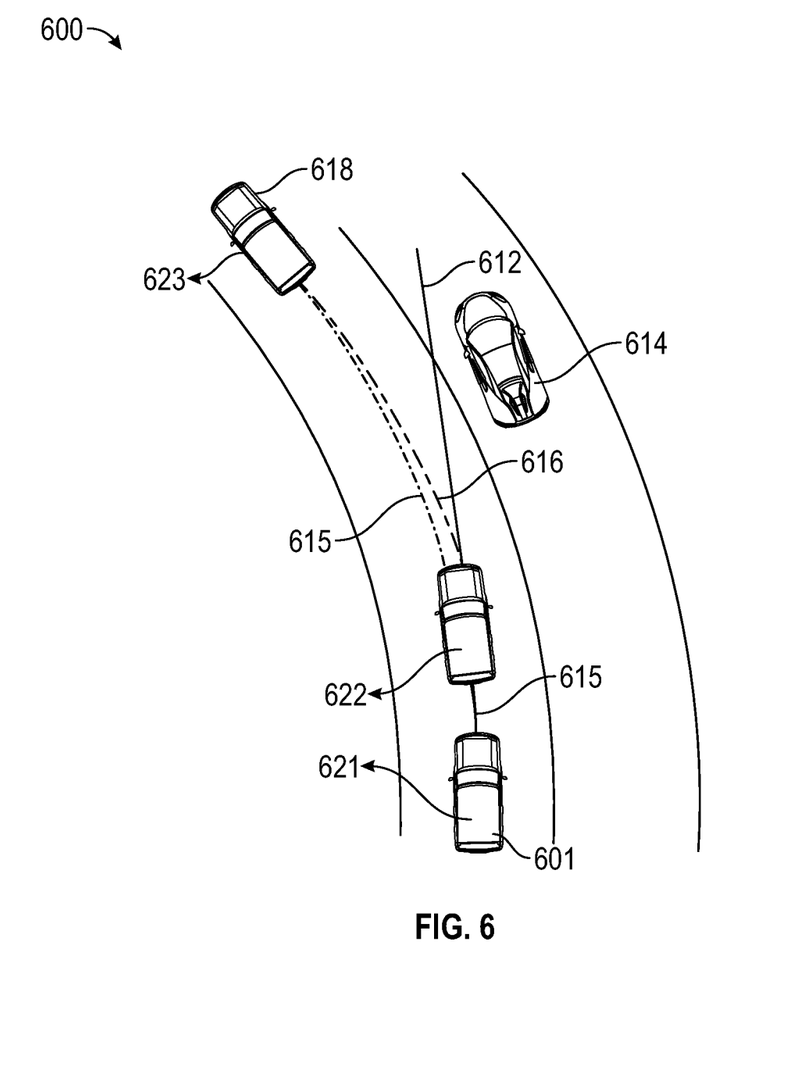

FIGS. 5 and 6 depict exemplary implementations of the process 200 of FIG. 2, including the subroutine 205 of FIGS. 4, in accordance with exemplary embodiments.

Specifically, FIG. 5 depicts a first illustration 500 of a vehicle implementing the techniques of the process 200 of FIG. 2 (including the subroutine of FIG. 4). With continued reference to FIG. 5, in an exemplary embodiment, the vehicle 100 begins at a first position 501 at an initial point in time 502 (e.g., corresponding to "i=0)"). In various embodiments, if the driver is incapacitated and the vehicle 100 proceeds along a current path 512 (without intervention via the process 200), then the vehicle 100 would likely end up in an undesirable position 514 at a subsequent point in time 504 (e.g., corresponding to "i=N"). However, with the intervention via the process 200, the vehicle 100 travels along a corrected path 516, resulting in a desirable position 518 for the vehicle 100.

FIG. 6 depicts a second illustration 600 of a vehicle implementing the techniques of the process 200 of FIG. 2 (including the subroutine of FIG. 4). With continued reference to FIG. 6, in an exemplary embodiment, the vehicle 100 begins at a first position 601 at the initial point in time, in which it is determined that the driver is incapacitated and a side threat is detected at stage 621. In certain embodiments, calculations are performed at stage 622, including as to the safety margin and optimal intervention time in order to avoid a vehicle event. In various embodiments, without intervention, the vehicle 100 would travel along a current path 612 and would likely end up in an undesirable position 614 at a subsequent point in time. However, with the intervention via the process 200, the vehicle 100 travels along a corrected path 616, resulting in a desirable position 618 for the vehicle 100. Specifically, in various embodiments, during stage 623, the vehicle 100 is automatically centered with respect to a center line 615 of the roadway, and the vehicle 100 is allowed to coast to a safe stop accordingly. In various embodiments, audible and haptic alerts are provided, along with hazard lights for the vehicle 100. In addition, in certain embodiments, emergency authorities are also contacted automatically in accordance with instructions provided by the processor 142 of FIG. 1.

Accordingly, methods, systems, and vehicles are provided for controlling automated features for a vehicle. In various embodiments, the disclosed methods and systems receive sensor data as to the driver of the vehicle and as to the operation of the vehicle and the surroundings of the vehicle, and control automated features of the vehicle (including automated steering, automated braking, automated alerts for the driver, and various other automated features), including when the driver is incapacitated.

In various embodiments, the techniques described herein may be used in connection with vehicles having a human driver, but that also have automatic functionality (e.g., automated parking and/or assisted driving). In various embodiments, the techniques described herein may also be used in connection autonomous vehicles, such as semi-autonomous and/or fully autonomous vehicles.

It will be appreciated that the systems, vehicles, and methods may vary from those depicted in the Figures and described herein. For example, the vehicle 100 of FIG. 1, the control system 102, and/or components thereof may differ from that depicted in FIG. 1. It will similarly be appreciated that the steps of the processes and implementations of FIGS. 2-6 may differ from those depicted in the Figures, and/or that various steps may occur concurrently and/or in a different order than that depicted in the Figures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
obtaining sensor data, from one or more sensors of a vehicle, the sensor data pertaining to both a driver of the vehicle and an environment surrounding the vehicle;
determining, via a processor using the sensor data, when the driver is incapacitated;
determining, via the processor using the sensor data, when a threat is detected for the vehicle; and
taking action to avoid the threat when the driver is incapacitated and the threat is detected, in accordance with instructions provided by the processor; and
calculating, via the processor, a safety margin for a vehicle event associated with the threat, based on a virtual receding horizon using the sensor data;
wherein the step of taking the action comprises taking the action based on the safety margin when the driver is incapacitated and the threat is detected, in accordance with the instructions provided by the processor.

2. The method of claim 1, wherein the step of taking the action further comprises automatically providing an alarm when the driver is incapacitated and the threat is detected, in accordance with the instructions provided by the processor.

3. The method of claim 1, wherein the step of taking the action further comprises automatically controlling movement of the vehicle when the driver is incapacitated and the threat is detected, in accordance with the instructions provided by the processor.

4. The method of claim 3, wherein the step of automatically controlling movement of the vehicle further comprises automatically controlling braking and steering of the vehicle, in accordance with the instructions provided by the processor, when the driver is incapacitated and the threat is detected.

5. The method of claim 1, further comprising:

calculating, via the processor, an optimal time for intervention to avoid the vehicle event, based on the safety margin using the sensor data;

wherein the step of taking the action further comprises taking the action with timing that is based also on the optimal time when the driver is incapacitated and the threat is detected, in accordance with the instructions provided by the processor.

6. The method of claim 5, wherein the optimal time is determined via the processor as a latest possible time to safely avoid the vehicle event.

7. The method of claim 1, further comprising:

determining, via the processor using the sensor data and the safety margin, a capability of one or more automated driving features for avoiding the vehicle event;

wherein the step of taking the action is further based on the capability of the one or more automated driving features for avoiding the vehicle event.

8. The method of claim 7, wherein the step of taking the action further comprises providing an alert for one or more individuals outside the vehicle when it is determined that the one or more automated driving features are not capable for avoiding the vehicle event.

9. A system comprising:

one or more sensors configured to obtain sensor data pertaining to both a driver of a vehicle and an environment surrounding the vehicle; and a processor that is coupled to the one or more sensors and that is configured to at least facilitate:

determining, using the sensor data, when the driver is incapacitated;

determining, using the sensor data, when a threat is detected for the vehicle;

calculating a safety margin for a vehicle event associated with the threat, based on a virtual receding horizon using the sensor data; and taking action to avoid the threat based on the safety margin when the driver is incapacitated and the threat is detected, via instructions provided by the processor.

10. The system of claim 9, wherein the processor is configured to at least facilitate automatically providing an alarm when the driver is incapacitated and the threat is detected, via the instructions provided by the processor.

11. The system of claim 9, wherein the processor is configured to at least facilitate automatically controlling movement of the vehicle when the driver is incapacitated and the threat is detected, via the instructions provided by the processor.

12. The system of claim 11, wherein the processor is configured to at least facilitate automatically controlling braking and steering of the vehicle, via the instructions provided by the processor, when the driver is incapacitated and the threat is detected.

13. The system of claim 9, wherein the processor is configured to at least facilitate:

calculating an optimal time for intervention to avoid the vehicle event, based on the safety margin using the sensor data; and taking the action with timing that is based also on the optimal time when the driver is incapacitated and the threat is detected, via the instructions provided by the processor.

14. The system of claim 13, wherein the processor is configured to at least facilitate determining the optimal time as a latest possible time to safely avoid the vehicle event.

15. The system of claim 9, wherein the processor is configured to at least facilitate:

determining, using the sensor data and the safety margin, a capability of one or more automated driving features for avoiding the vehicle event; and taking the action, via the instructions provided by the processor, based on the capability of the one or more automated driving features for avoiding the vehicle event.

16. The system of claim 15, wherein the processor is configured to at least facilitate providing an alert for one or more individuals outside the vehicle, via the instructions provided by the processor, when it is determined that the one or more automated driving features are not capable for avoiding the vehicle event.

17. A vehicle comprising:

a body;

a drive system configured to generate movement of the body;

one or more sensors disposed on or within the body and configured to obtain sensor data pertaining to both a driver of the vehicle and an environment surrounding the vehicle; and a processor disposed within the body and coupled to the one or more sensors, the processor configured to at least facilitate:

determining, using the sensor data, when the driver is incapacitated;

determining, using the sensor data, when a threat is detected for the vehicle;

calculating a safety margin for a vehicle event associated with the threat, based on a virtual receding horizon using the sensor data; and taking action to avoid the threat based on the safety margin when the driver is incapacitated and the threat is detected, via instructions provided by the processor.

18. The vehicle of claim 17, wherein the processor is configured to at least facilitate:

calculating an optimal time for intervention to avoid the vehicle event, based on the safety margin using the sensor data; and taking the action based also on the optimal time when the driver is incapacitated and the threat is detected, via the instructions provided by the processor.

19. The vehicle of claim 18, wherein the processor is configured to at least facilitate:

providing a visual alarm based the optimal time when the driver is incapacitated and the threat is detected, via the instructions provided by the processor.

20. The vehicle of claim 18, wherein the processor is configured to at least facilitate:

providing an audio alarm based the optimal time when the driver is incapacitated and the threat is detected, via the instructions provided by the processor.

* * * * *